United States Patent [19]
Manning

[11] Patent Number: 5,367,262
[45] Date of Patent: Nov. 22, 1994

[54] ADVANCES IN HIGH FREQUENCY DIELECTRIC LOGGING

[75] Inventor: Michael J. Manning, Houston, Tex.

[73] Assignee: Halliburton Logging Serivces, Inc., Houston, Tex.

[21] Appl. No.: 194,811

[22] Filed: Feb. 14, 1994

Related U.S. Application Data

[63] Continuation of Ser. No. 729,293, Jul. 12, 1991, abandoned.

[51] Int. Cl.⁵ ............................ G01V 3/30; G01V 3/38
[52] U.S. Cl. ...................................... 324/341; 324/338
[58] Field of Search ................ 324/338, 339, 340, 341, 324/342, 343

[56] References Cited

U.S. PATENT DOCUMENTS

| | | | |
|---|---|---|---|
| 4,158,165 | 6/1979 | Coates | 324/338 |
| 4,893,084 | 1/1990 | Rau | 324/341 |

*Primary Examiner*—Walter E. Snow
*Attorney, Agent, or Firm*—Arnold, White & Durkee

[57] ABSTRACT

The present apparatus and method are directed to a high frequency dielectric measurement system for use in logging a well borehole. A transmitter transducer cooperative with one or more receiver transducers arranged on a common pad is utilized to make such measurements. Typically they occur in the gigahertz range. One feature of the present disclosure is the indication of the apparent water filled porosity of formations. Another feature relates to the formation of a quality curve obtained by breaking down the formation measurements into real and reactive components.

8 Claims, 11 Drawing Sheets

ADVANCES IN HIGH FREQUENCY DIELECTRIC LOGGING

This application is a continuation of application Ser. No. 07/729,293, filed Jul. 12, 1991 now abandoned.

BACKGROUND OF THE DISCLOSURE

Dielectric logging, introduced in the 1970's, added a new dimension to electromagnetic logging and has proven to be a valuable addition to formation evaluation. A new 1 GHZ, high-frequency dielectric logging tool has been developed with distinctive features relative to prior tools. The sensors are deployed by the tool using a pad on a flexible arm body instead of an in line configuration, thereby providing better sensor contact with the formation at the wall of the well borehole. Multiple antennas provide four independent measurements of formation dielectric properties with four different depths of investigation and four different vertical resolutions. Additionally, continuous operation of the transmitter and receiver channels, in addition to overcoming switching transients, also improves the ability to measure phase and amplitude of weak signals in highly attenuating (conductive) formations. A backup arm optionally deploys; a microlog pad to provide additional information on mudcake thickness, and to provide independent verification of thin bedding formation structure observed with the dielectric pad.

One of the dielectric measurements is derived using incident and reflected signals at the transmitter, independent of the antenna characteristics. In effect, this provides one set of dielectric properties at a zero source-to-detector spacing and hence maximizes vertical resolution of the logging tool. Internal calibration of the system over the dynamic range of the tool is made before and after logging, and is recorded in the calibration summary. Transformation of the calibrated phases and amplitudes to dielectric constant and resistivity (at the high frequency) is performed in realtime by the logging tool.

Log examples from several wells illustrate the improvements described above. Comparisons of conventional porosity logs with water filled porosity computed from the high frequency dielectric log are also made.

Dielectric tools determine the dielectric constant and conductivity of downhole formations from the real and imaginary parts of the complex propagation constant of electromagnetic waves travelling through the formations (T. J. Calvert, R. N. Rau and L. E. Wells, "Electromagnetic propagation . . . A new dimension in logging," presented at the Annual Meeting SPE, Bakersfield, Calif., April 1977, Paper 6542; D. S. Daev, Vysokochastonye Electromagnitnye Melody Issledevity. Skhvazhin:publ.House "Nedra," Moscow, 1970; R. A. Meador and P. T. Cox, "Dielectric constant logging, a salinity independent estimation of formation water volume," presented at the Annual Meeting SPE, Dallas, Tex., Oct. 1, 1975, Paper 5504). By measuring the phase difference and amplitude ratio between two points in the formation, the complex propagation constant is determined. Prior tools made this measurement differentially between the outputs of two receivers, while in the logging system disclosed, absolute phase and amplitude measurements are made at all receivers. Differential measurements, while reducing the effect of mudcake on the tool response, also reduce the dynamic range of the signals. To obtain high accuracy in the measurements, the receivers are optimally separated, with the separation limited, by the minimum detectable signal at the farthest receiver. Measurements of each receiver's phase and amplitude with respect to the transmitter increases the accuracy of the measurements by increasing the dynamic range of the signals without sacrificing signal strength. Absolute measurement also provides additional depths of investigation compared to differential measurements. If a differential measurement is desired, it can be obtained from the absolute measurement whereas the converse is not true.

Dielectric constants of downhole formations largely indicate the amount of water in the pores, since the dielectric constant of water is an order of magnitude greater than the highest dielectric constant of all other materials commonly found in the downhole environment. Water filled porosity can be determined from both the dielectric and the conductivity measurements (Poley, J.Ph., Nooteboom, J. J., de Waal, P. J.: "Use of VHF Dielectric Measurements for Borehole Formation Analysis," The Log Analyst vo. 19, pp 8–30 May-June 1978), and water saturation can be computed if formation porosity is known. Comparison of dielectric log results with water saturations obtained from other resistivity tools have provided means to probe the flushed zone of the formation. The apparent high frequency conductivity measured by conventional pad type resistivity devices. This is partly because the dielectric losses of water, which are large at high frequencies, cannot be separated from conductivity losses and partly because of mixing effects of pore distribution and fluid conductivity on electromagnetic fields.

This one GHz high frequency dielectric logging tool has been developed with distinctive features relative to prior tools, e.g., Calvert, supra. The high frequency dielectric tools has multiple antennas and greater spacing between the receivers to provide added and increased depths of investigation. The sensors of this disclosure are deployed on an independently articulated pad instead of being fixed on a mandrel body. A backup arm deploys a conventional microlog sensor. Unlike prior tools where the complex propagation constant measurement is made differentially between a pair of receivers, the high frequency dielectric measurements are made between the transmitter and each of several individual receivers. In addition to providing multiple depths of investigation and corresponding multiple vertical resolutions, this approach greatly increases the dynamic range of the signals measured. Unlike prior tools which multiplex the received data, the high frequency transmitter and receiver channels continuously sample the formation, thereby improving the signal-to-noise ratio or S/N of the measurement. This feature provides the ability to deploy a long spaced receiver with a deeper depth of investigation. Another novel feature of the present high frequency dielectric tool is that, for the first time, the measurement of both incident and reflected transmitter signals has been incorporated in a dielectric tool. Determination of dielectric constant and resistivity is made from the phase and amplitude measurements at each receiver and at the transmitter. The transmitter reflection measurement is equivalent to a receiver at zero spacing, maximizing the vertical resolution of the log, the tool has a Z axis oriented accelerometer to measure lengthwise acceleration to correct for erratic tool movement.

The mechanical design of the tool incorporates certain features such as a versatile pad mounting scheme, for the quick change, wear resistant sensor pad. The mechanical mandrel incorporates a fully independently actuating, dual pad linkage designed to operate a fully diverse range of borehole conditions. Each pad is carried by an independent parallelogram arm structure that delivers a constant pad force against the adjacent sidewall over the full range of pad displacement, thereby enabling the tool body to extend the sensors at any position in the borehole and still maintain proper pad contact with the borehole wall. With the extended reach of the arms, the tool is capable of logging in horizontal, deviated and washed out holes. The individual caliper measurement as well the borehole diameter are also recorded. The electrical power and communication between the instrument section and the dielectric sensor pad is furnished through a cable system consisting of a stainless steel cable encased in a braided, stainless steel flexible jacket. The coaxial cables are coiled at each pivot point of the parallelogram structure, enabling the cable to flex at each pivot point. Each metal cable is housed inside the arm assembly of the dielectric pad. The arm assembly with the cables can be disassembled as a single unit for quick field service. The dielectric sensor pad itself can be quickly changed. The pad has a hardened wear plate and mudcake plow assembly. The microlog pad is readily replaced with a metal shoe to log boreholes less than $7\frac{7}{8}$ inches in diameter. The tool is designed to be fully compatible with other tools positioned above and below it.

A block diagram of tool the present device utilizes the in phase and quadrature signal resulting from an 2 KHz square wave oscillator. The square wave signal is mixed with a one GHz signal to generate a transmitter signal pulsed at an audio frequency. Although this technique complicates the transmitter data handling, it improves measurement accuracy. This improvement occurs because the received signal is down converted to the audio frequency or 2 KHz by a mixer connected to the receiver antenna, and therefore the receiver is not required to contend with phase and amplitude changes of high frequency signals. The transmitter signal is amplified and fed to the transmitter antenna via a directional coupler which samples the incident and reflected signals for the measurement. The measurement is invariant to signal phase and amplitude changes that occur prior to arrival at the directional coupler. By design, the coupler is placed in close proximity to the transmitting antenna. The wide dynamic range of the receiver signals dictates the use of automatic gain control (AGC) amplifiers which reduce by approximately 40 dB the amplitude range seen by the phase selective detector in the receiver. The gain of these amplifiers is digitally controlled, and the gain control number is transmitted uphole through the data acquisition and telemetry system. The output from the AGC amplifiers sent to phase selective detectors where in phase and quadrature components of the 2 KHz signals are measured, digitized and transmitted to the surface.

Calibration of the tool is accomplished in two steps. An internal calibration of the receivers over the dynamic range of the tool is made before and after logging, and the results are stored and presented in the calibration summary. This calibration corrects for phase and amplitude deviations of the electronic circuits in the instrument section. The pad electronics, the sensors and the entire tool are calibrated in the second step, which involves using an external calibration medium placed over the sensors and on the pad. The external calibration is done prior to field use. During logging, the phase and amplitude from the transmitter incident and reflected signals, as well as the receiver signals, are acquired and recorded at a selected sample rate such as every 0.2 inches. The usual real time log display is usually based on an average of this data over selected intervals such as 0.25 feet. Based on algorithms developed from mathematically modeling a magnetic dipole, calibrated phases and amplitudes are transformed into the formation dielectric constant and 1 GHz resistivity. Normal and lateral resistivities from the microlog, and radii from the two caliper measurements are also presented at selected data intervals. The microlog measurement provides independent verification of mudcake thickness and bedding structure observed by the dielectric measurement.

An additional processing step, performed in realtime, is the computation of an apparent water filled porosity useful for a quick interpretation and a high frequency dielectric quality curve which is useful for assessment of log quality. Computation of apparent water filled porosity is a standard analysis technique for electromagnetic well logs. For dielectric well data determinations an additional level of sophistication is available in the analysis of apparent water filled porosity by using both the measured dielectric constant and high frequency resistivity together in the analysis. The additional information in dielectric logs may based to derive an indicator of log data quality.

Generally, this quick analysis technique computes a complex, apparent water filled porosity from dielectric logs and displays the imaginary part of the complex apparent water filled porosity as a quality indicator. The porosity computation may employ any mixing model which employs the measured complex dielectric constant in any way of its several forms and may be applied to any dielectric log. The procedure is most useful when the measured real and imaginary parts of the complex dielectric constant are of the same order of magnitude. While this procedure is valid for any complex mixing and model and for any dielectric log, the realtime implementation uses the complex refractive index model (R. N. Rau and R. P. Wharton, "Measurements of core electrical parameters at UHF and microwave frequencies," presented at annual Meeting SPE, Dallas, Tex., September 1980, Paper 9380; Shen, L. C., Manning, M. J. and Price, J. M., 1984, Application of Electromagnetic Propogation Tool in Formation Evaluation, Paper J: Transactions, SPWLA) and uses the described 1.0 GHz high frequency dielectric log tool. Setting $S_{xo}$ equal to 1.0, the procedure solves the mixing equation for porosity, taking the real part of the computed porosity as the apparent water filled porosity anti displays the imaginary part of the computed result as a quality indicator.

These computations do not require input from other logging devices and may therefore be performed in real time or during post log analysis. When the dielectric log is run in combination with other devices such as density or neutron well logging tools, the apparent water filled porosity from the dielectric log may be overlaid with density or neutron porosity to provide a useful and quick analysis technique. The addition of the quality curve helps eliminate log intervals with poor data quality from the quick analysis.

Interpretation of the quality curve involves the identification of sharp spikes in the actuality curve, which are usually associated with rugosity effects on the log data, or the identification of extended intervals of smooth, non-zero values, which may represent any discrepancy in the model. Smooth, non zero values may be caused by lithologies, incorrect input of mud filtrate values, or flushed zone water saturation less than 1. Uses of the quality curve and apparent water filled porosity are illustrated in the log examples which follow.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
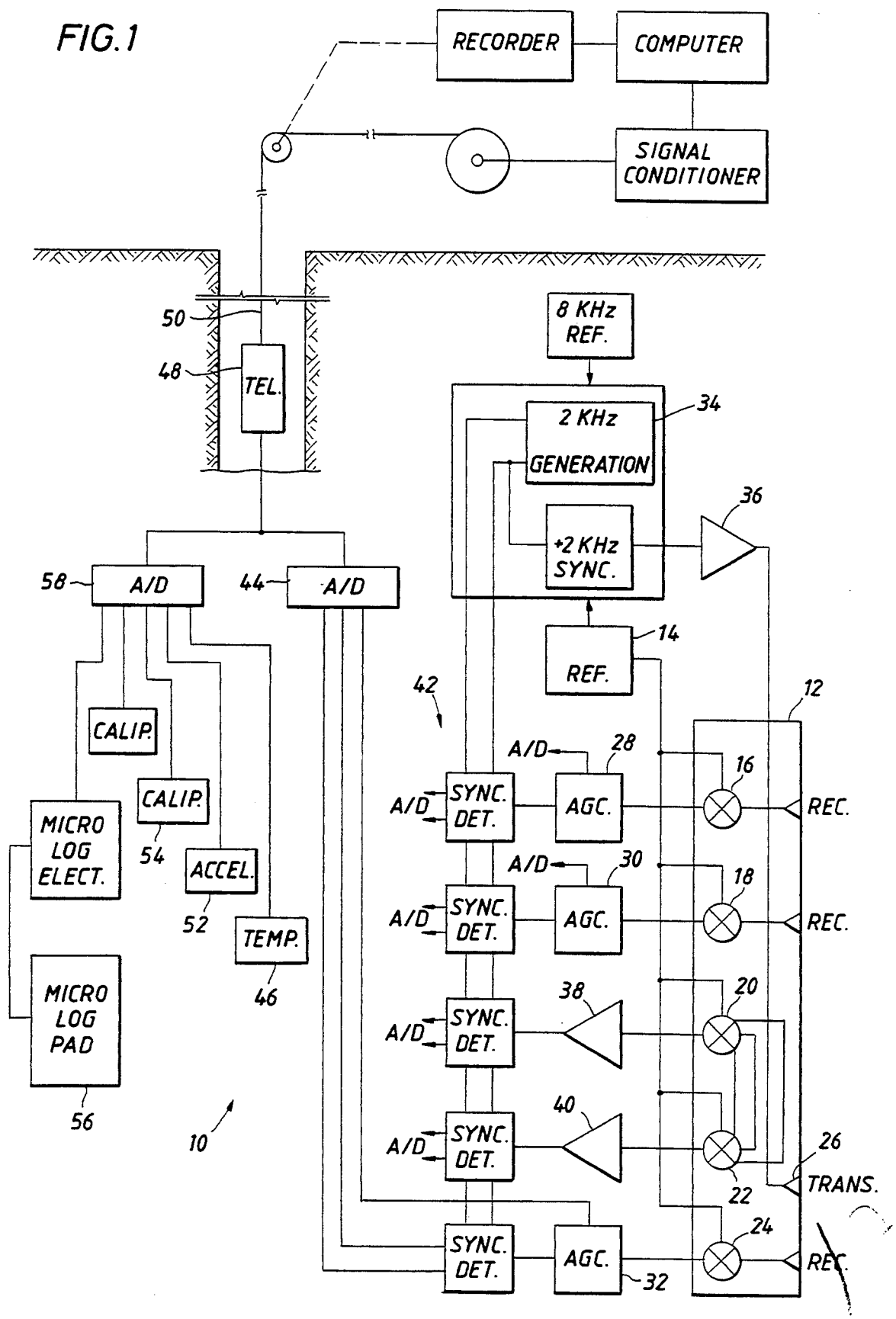
FIG. 1 is a schematic block diagram of the circuitry involved in a gigahertz system for measuring dielectric showing the mounting of the transmitter and receivers in a pad and further showing the apparatus for providing the data on a logging cable extending to the surface.

Attention is now directed to FIG. 1 of the drawings where the numeral 10 identifies the high frequency dielectric measurement system of the present disclosure. More importantly, it has a pad mounted structure at 12 which is deployed on a mounting arm and is able to be extended towards the well borehole and contact the side during movement along the well. As shown on the pad area, there are rotor transducers, one serving as a transmitter antenna and the other three being receivers. The spacing between the transmitter and the three receivers is different so that different depths of measurement or investigation can be carried out. The three receivers are spaced arbitrarily at the distances of 8, 12, and 17 centimeters to vary the depths of investigation. All three of the receive is respond to the same transmission from the transmitter and accordingly, they operate on a common transmission format.

Transmission the gigahertz range, the preferred frequency being about 1 GHz from a gigahertz reference source 14. As wilt be observed in the drawings, it is connected through various adders at 16, 18, 20, 22 and 24 so that the gigahertz signal is provided for transmission from the single transmitting sensor at 26, and the gigahertz signal is received at the three receivers for processing through the adders connected to the receivers whereby the receivers provide an output after mixing to the amplifiers at 28, 30 and 32. These amplifiers are provided with an input signal which is the difference in frequency between the transmitted 1 GHz signal beat against the reference signal so that the difference signal is output by means of the amplifiers in question. Each of the three amplifiers is an automatic gain control amplifier which forms a gain control signal which is output also. Therefore, the output measurement indicative of the value of any particular signal is indicated by the amplifier output plus the AGC signal representative of the control setting of the amplifier. By this mechanism, each amplifier is able to accommodate a very wide dynamic range.

The system is pulsed and, to this end, the numeral 34 identifies an audio frequency quadrature generator. The generator 34 provides two outputs which are phase shifted by 90°. The output is provided to the transmitter through a coupling amplifier 36. In the preferred embodiment the audio frequency is arbitrarily selected to be 2 KHz which controls gating of the transmitted 1 GHz signal. In addition to that, the system utilizes two signals from the transmitter which are amplified and output in the same fashion as the receiver signals utilizing the AGC amplifiers 28, 30 and 32. There are amplifiers at 38 and 40 which are connected by suitable conductors to the adders 20 and 22 previously mentioned. This provides two signals associated with the transmitter side of the system. The adders are connected so that they provide these signals from the transmitter side. This is explained in greater detail in U.S. Pat. No. 4,893,084 of Rama Rau which has been assigned to the assignee of the present disclosure. Accordingly, the amplifiers 38 and 40 provide the two transmitter signals as well its the three different receiver sensor signals which are output its described above.

In summary, this provides five different signals to synchronous detectors at 42. These are driven by the quadrature signals from the audio frequency generator 34. As mentioned, the preferred frequency is 2 KHz. Recalling that the transmitter signal is gated in this fashion, the detectors at 42 provide quadrature measurements of the five input signals, and these are transferred to an analog digital converter (ADC) 44. That in turn connects with a telemetry circuit 48 which then connects with logging cable 50 so that the data can be conveyed to the surface. FIG. 1 further includes other measuring devices. These include a temperature measuring sensor 46. Also the numeral 52 identifies a Z axis accelerometer. It is deployed with the dielectric pad 12 so that it can measure chattering or shock movements of the sensors; it is useful to identify when sharp or rapid movements occur because that is the occasion at which the data is most suspect. Moreover such chattering causes spikes in the data which might otherwise be unexplained. Since measurements of acceleration are chartered to provide a track of the position of the dielectric pad 12, and this data is used primarily for assuring that the data is not otherwise disqualified by virtue of the sudden movements of the dielectric pad. In addition to the accelerometer 52, the equipment includes one or more calipers at 54. These provide measurements of the diameter of the hole along the well. Two or more are used so that different measurements can be provided. Last of all, FIG. I additionally shows a microlog pad 56 for contact against the well borehole to conduct additional measurements which are provided to the surface through a similar ADC 58. That also is connected to the telemetry system for transmission of data to the surface. The ADC is provided with the measurements from the other sensors including the thermometer 46 accelerometer 52 and the various calipers 54.

Figure 8:
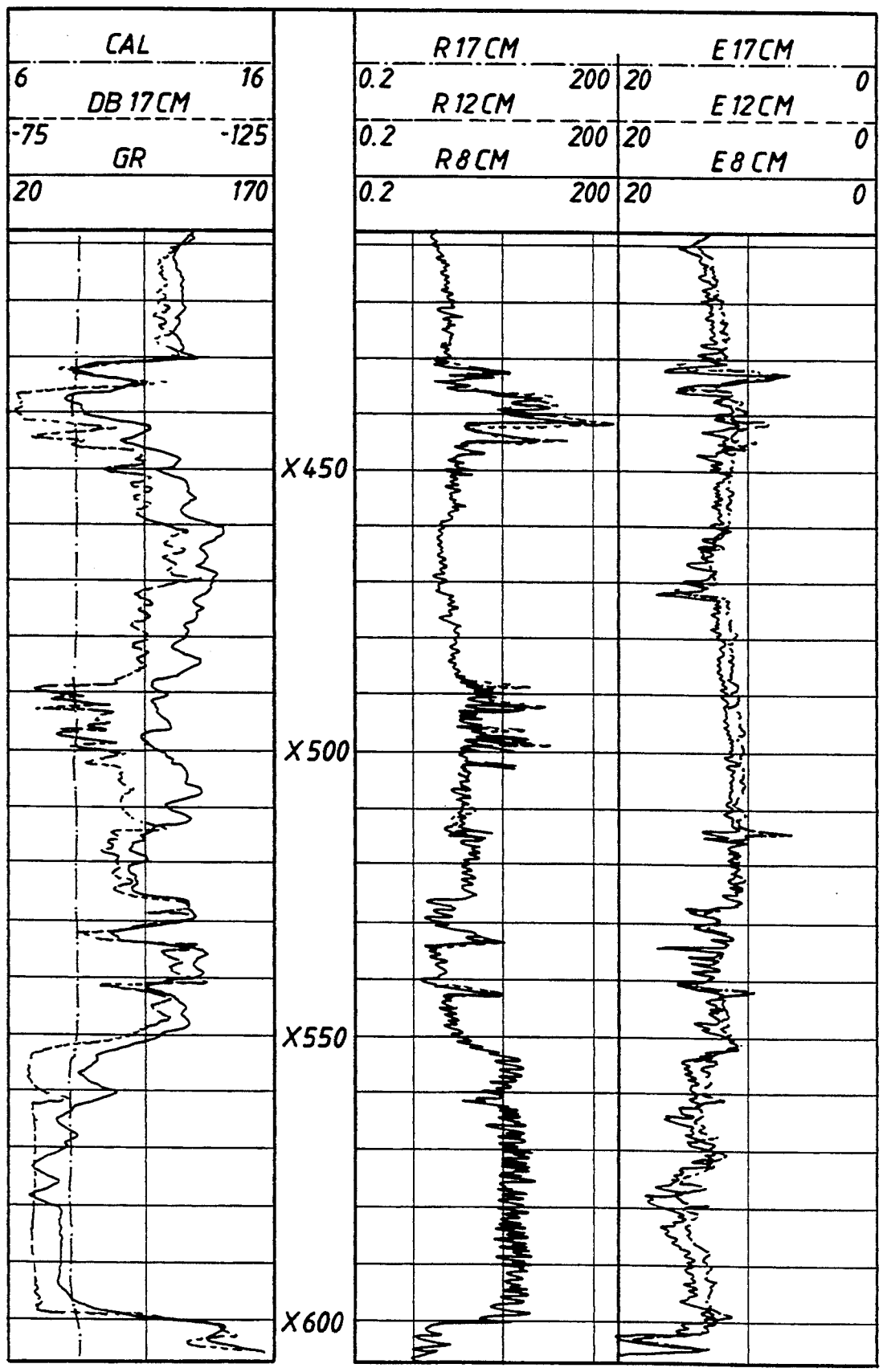
FIG. 8 is another exemplary log.
Figure 9:
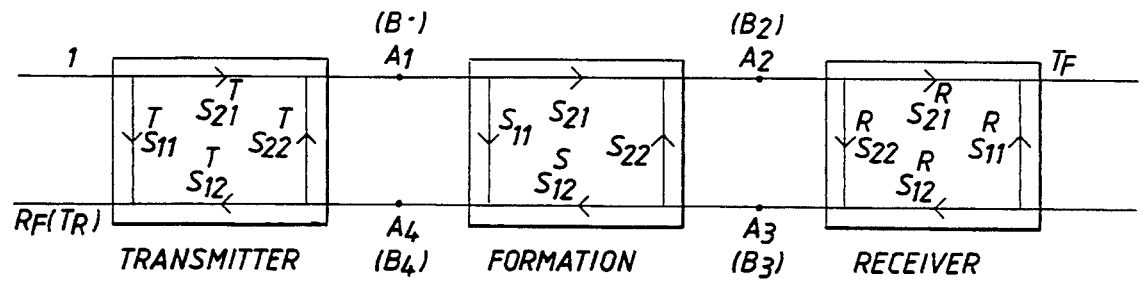
FIG. 9 is an equivalent circuit showing the signal transfer characteristics between transmitter formation and receiver.

Attention is now shifted to the drawing at FIG. 9 which is a tutorial description of the interplay between the transmitter the formation and the receiver. This will be explained and described so that the operation of the present system will be understood. After that, a description will be extended by discussing the logs obtained from various wells in FIGS. 2–8, and also a description will be provided for the cross plots of FIGS. 10, 11 and 12.

This one GHz high frequency dielectric tool has been developed with dielectric sensors which make four simultaneous sets of measurements with different depths of investigation and vertical resolutions as shown in FIG. 1. The four sensors are deployed on a pact which extends from the main body of the tool. A second independently articulated pad is on the backup arm, and incorporates a microlog measurement apparatus 56 in FIG. 1. The use or pads accomplishes better contact with the borehole wall than is possible with sensors flush mounted on the sonde.

The absolute phase of amplitude measurements is made at each receiver. Additional phase and amplitude information is obtained from reflectivity measurements made at the transmitter. The absolute nature of these measurements permits the independent calculations of dielectric constant and resistivity at each receiver and the transmitter as well as the conventional measurements between receivers. The long spaced receiver senses deeper into the formation than previously possible at this frequency, and at the same time the transmitter reflectivity measurement (with an effective zero source detector spacing) is capable of much finer vertical resolution.

The dielectric constants and resistivities from the tool 10 are computed in real time along with apparent water filled porosity values. A unique porosity quality indicator based on the imaginary component of the computed porosity is also an output on the log and is very useful in identifying borehole intervals where borehole rugosity impacts the computed log values. The log presentation also employs an overlay of the dielectric constant and resistivity values computed from the various receivers. This overlay, due to the depth profiling derived from this measurement, permits easy identification of mudcake or invasion effects in the formation.

Figure 10:
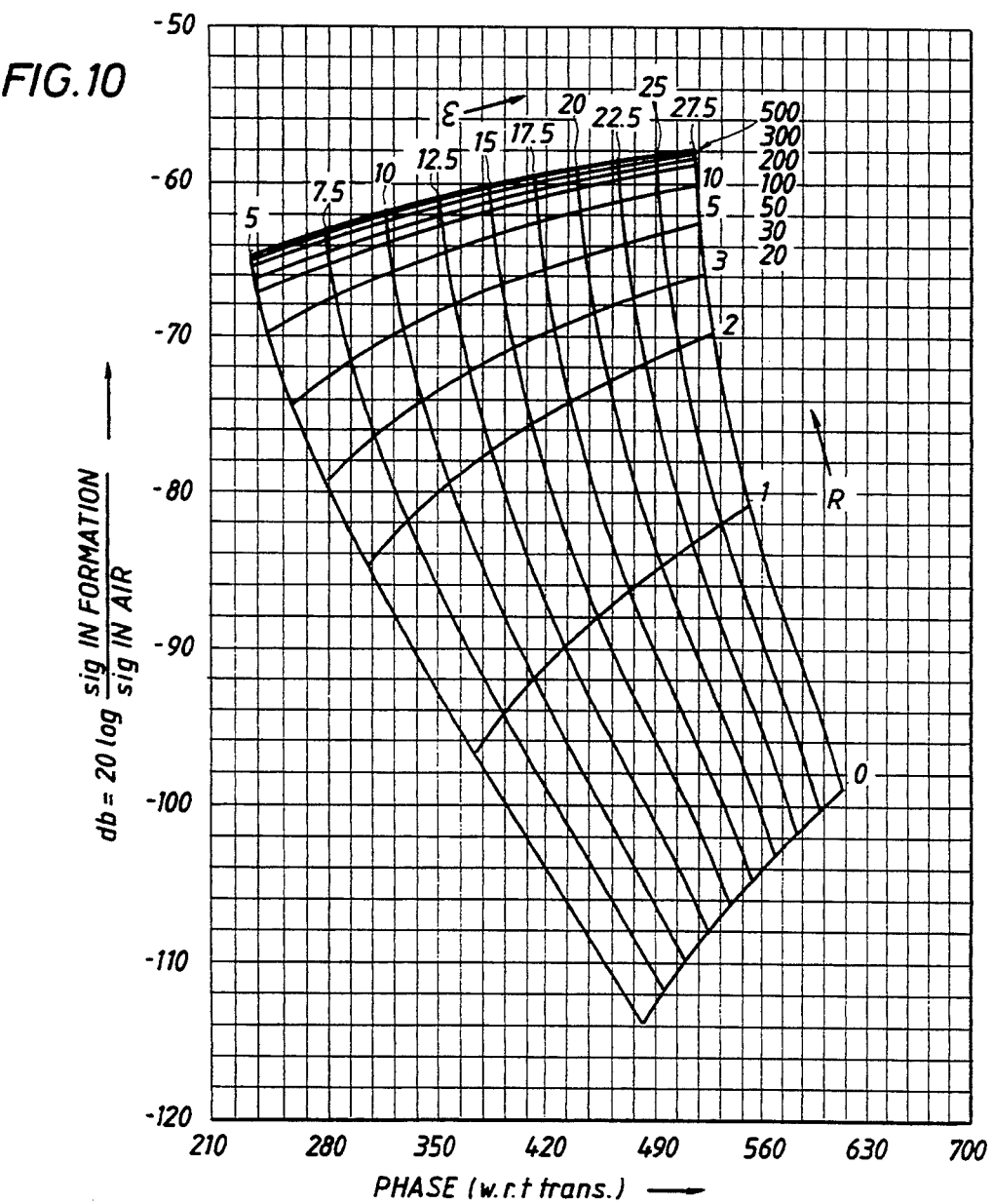
FIGS. 10, 11 and 12 show the high frequency dielectric tool crossplot for receiver transducers at increasing spacing from the transmitter.
Figure 11:
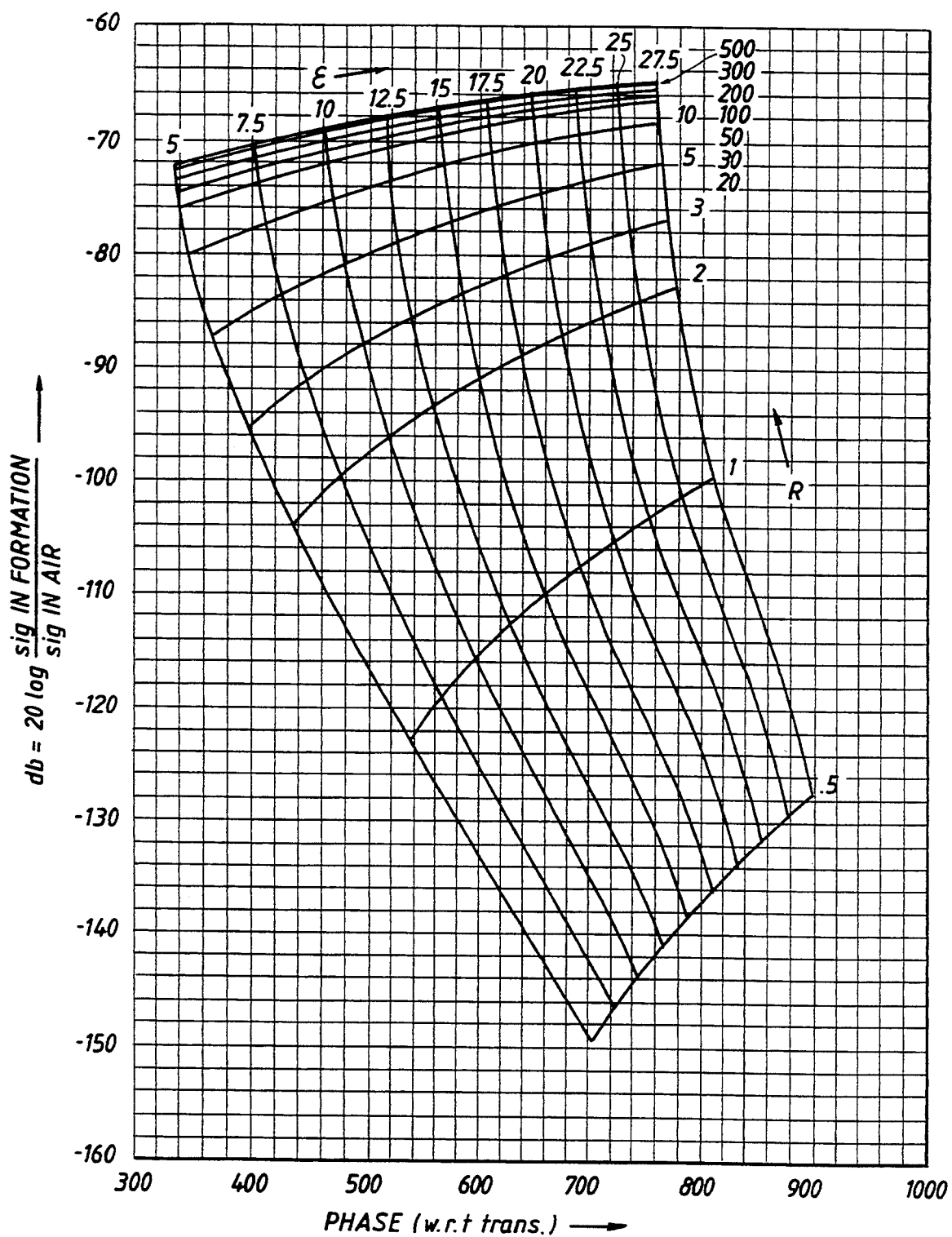
Figure 12:
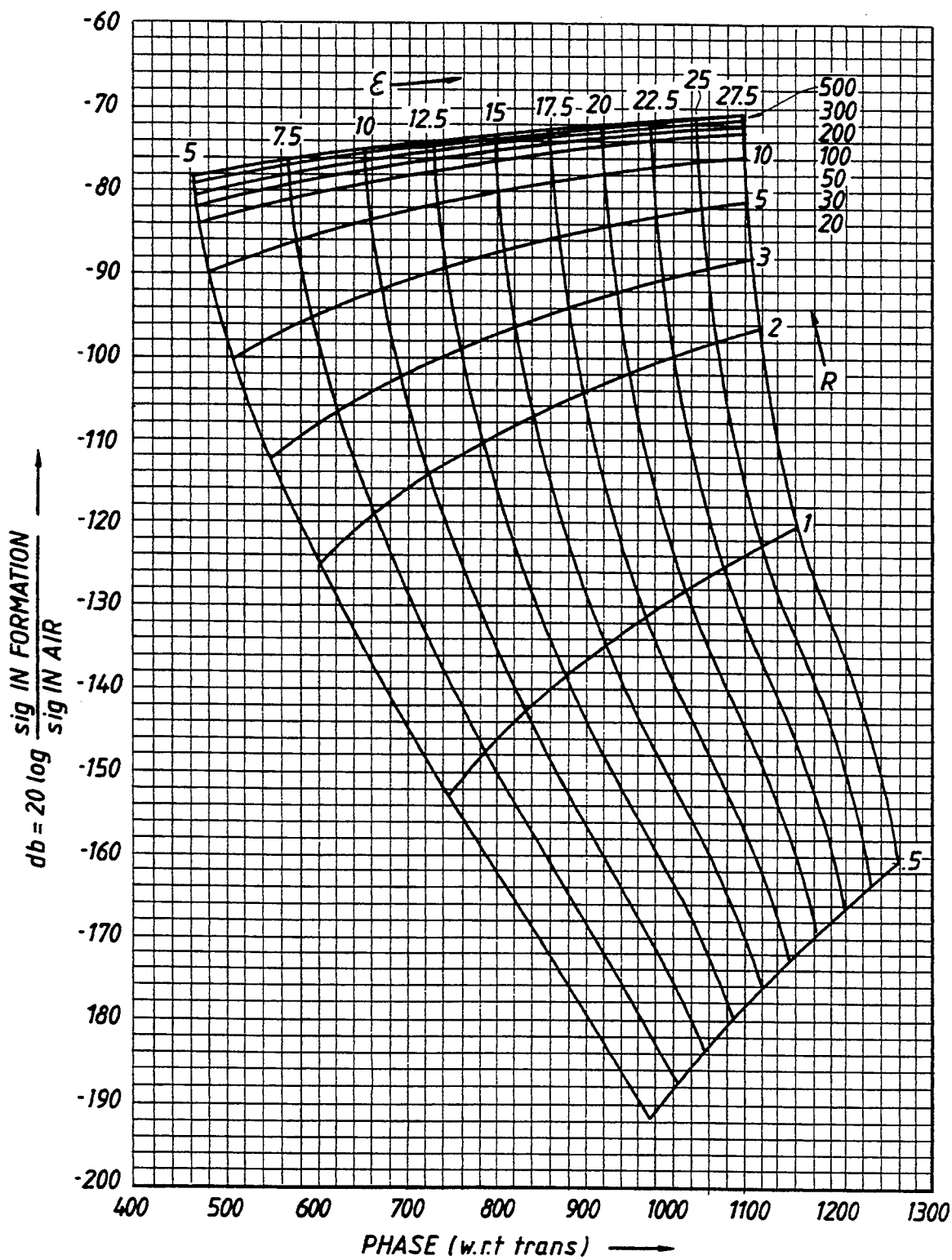

In order to determine the electromagnetic properties of the formation, one data is the phase and amplitude of the electromagnetic signal from the transmitter to the receiver. For practical reasons, measurements of phase and amplitude are done at locations different from these desired locations. Hence, there are circuit components (such as transmission lines) between the measurement points. The purpose of the S parameter measurement is to effectively bring the measurement points to the desired points through mathematical transformation. It is based on the theory that if the measurement point and desired point are connected by a two port passive linear network, then the network can be completely described by three parameters. This is frequency dependent because; the parameters are assumed to be in the form of complex impedances of the general form $A+jB$ where the first term is resistive and the second is the reactive or frequency related term. The transmitter two port network characterizes electrically the properties from the transmitter to the radiating face of the transmitter antenna. By terminating the transmitter antenna with three different loads and measuring the incident and reflected signals at the measure point, then the measuring the incident and reflected signals at the measure point, the three S parameters that describe this network can be completely determined. The formation itself can be described as a two port network and its S parameters are the desired characteristics from which formation electromagnetic properties will be ascertained. Similarly, the network from the face of the receiver to the receiver measuring point is characterized by a receiver S parameter network. The S parameters for each receiver are measured in the laboratory and stored in the computer memory. During logging, the measured reflected data represent the combined effects of the three networks of FIG. 9. Using the described mathematical procedure to eliminate the effects of the transmitter and receiver antennas (FIG. 9) from the measurements, it is possible to determine the formation reflection and transmission coefficients. Mathematical modeling based on magnetic dipole antennas relates formation dielectric constant and resistivity with the three receivers are shown in FIGS. 10 to 12. Formation impedance is computed from the reflection coefficient. Dielectric constant and resistivity can be ascertained from the formation impedance. The formation impedance is primarily determined from the reflection measurement. The reflection measurement compared to the transmission measurement has a smaller dynamic range. Also, a large fraction of the reflected signal comes from the formation close to the transmitter antenna.

The measurements are made in the following manner. The transmitter antenna is terminated in a load having complex impedance Z. In FIG. 9, $S_{11}$ is the mismatch looking into the antenna terminal (port 1) from the measuring system when the antenna face (port 2) is in contact with reflectionless medium. $S_{21}$ and $S_{12}$ are the forward and reverse transmission coefficients of the antenna. $S_{22}$ is the mismatch looking into the antenna face (port 2) when the antenna (port 1) is terminated in a reflectionless measuring system. The measured reflection is given by equation 1:

$$S_{11}^m = S_{11} + \frac{S_{12}S_{21}\Gamma}{1 - S_{22}\Gamma} \quad (1)$$

where $S_{11}{}^m$ is measured reflection by the measuring system; and $\Gamma$ = the complex reflection coefficient of the medium contact with the face of the antenna.

In the foregoing, $\Gamma$ is determined by equation 2:

$$\Gamma = \frac{\frac{Z^*-1}{Z_0}}{\frac{Z^*+1}{Z_0}} \quad (2)$$

where $Z_0$ is the characteristic impedance of the measuring system, typically 50 ohms, and $Z^*$ is the complex impedance of the medium.

By using three different media of known impedances, equation 2 enables equation 1 to be solved to determine $S_{11}$, $S_{12}$, $S_{21}$ and $S_{22}$.

Separately, the transmitter and antenna (FIG. 9) are measured to obtain the S parameters for both of them. These values are fixed in view of the fact the transducers and connected components are operated at a single frequency. The next step is to measure the values for the formation between the transmitter and receiver in FIG. 9. The unknown formation lies between the transmitter and receiver antenna. One may assume the formation to be a reciprocal network i.e. $S_{21}$ is equal to $S_{12}$ so that one needs only to determine $S_{21}$. Assume also that the formation is homogeneous and that the transmitter and receivers are widely separated so that there is isolation between the two formation (input and output) ports, i.e. measurement of $S_{11}$ is independent of $S_{22}$ and vice versa. $S_{11}$ and $S_{22}$ of the formation are determined by measuring the transmitter incident and reflected signals when the transmitter antenna is at a first location, and later when the transmitter is at the receiver locations. Restated. $S_{11}$ is measured as the logging tool moves along the well borehole. $S_{11}$ at one location is the value of $S_{22}$ at another location, namely, when the transmitter is located where the receiver either was once located or will be located. Then signal flow theory can be applied to FIG. 9, using T and R as superscripts to identify the transmitter or receiver, so that equations 3-8 are developed:

$$A_1 = S_{21}{}^T + S_{22}{}^T A_4 \qquad (3)$$

$$A_3 = S_{22}{}^R A_2 \qquad (4)$$

$$R_F = S_{11}{}^T + S_{12}{}^T A_4 \qquad (5)$$

$$T_F = S_{21}{}^R A_2 \qquad (6)$$

$$A_2 = S_{21} A_{11} + S_{22} A_3 \qquad (7)$$

$$S_{11} = \frac{A_2}{A_1} - S_{22} \qquad (8)$$

substituting front equation 4, above, one gets equation 9:

$$S_{21} = \frac{T_F}{S_{21}^R} [1 - S_{22} S_{22}^R] \qquad (9)$$

Following the form of equation 1, one gets equation 10:

$$R_R = S_{11}^R + \frac{S_{12}^R S_{21}^R S_{22}}{1 - S_{12}^R S_{22}} \qquad (10)$$

Solving; for $S_{22}$, one gets equation 11:

$$(1 - S_{22} S_{22}^R) = \frac{S_{12}^R S_{21}^R}{(R_R - S_{11}^R) S_{12}^R S_{21}^R} \qquad (11)$$

Substituting equation 11 in equation 9, one such equation 12:

$$\frac{T_F S_{21}^R S_{12}^T}{[(R_R - S_{11}^R) S_{22}^R + S_{12}^R S_{12}^T] [R_F - S_{11}^T) S_{22}^T + S_{12}^T S_{21}^T]} \qquad (12)$$

This is the value of the formation parameter $S_{21}$ (also equal to $S_{12}$). In the foregoing, the symbols are more fully detailed in the reference (W. Kruppa, K. F. Sodomsky, "An Explicit Solution for the Scattering Parameters of a Linear Two-Port Measured with an Imperfect Test Set," IEEE Transactions on Microwave Theory and Techniques, vol. MTT-19, January 1971, pp. 122-123).

DIELECTRIC AND RESISTIVITY CROSSPLOT FOR A PARTICULAR EMBODIMENT

FIGS. 10, 11 and 12 show the high frequency dielectric tool information in a dielectric-resistivity crossplot. Across the bottom of the three curves, phase is measured with respect to the transmitter. In other words, phase at the transmitter is zero degrees and the phase shift shown in the several crossplots is referenced to the transmitter for the three receivers. Noting the receivers are spaced at 8, 12 and 17 cm., the three graphs show a greater phase shift at the more remote receiver. The ordinate in all three crossplots is represented in decibels and is defined as 20 times the logarithm of the signal in the formation over the signal in air. Comparing all three of the crossplots, the more remote receiver has a smaller signal which again is intuitive. The crossplots of the three receivers show the relationship ranging from 0.5 up to 500 ohms.

FIELD LOG EXAMPLES

Log data from a Permian Basin well drilled with salt mud are represented in FIGS. 2, 3, 4 and 5, and include raw log data, calibrated phases and amplitudes dielectric constants and resistivities, and apparent water filled porosity. Porosity and permeability may be described as spotty, or as interconnected logs associated with large scale textural features. Porous and permeable intervals are expected to display low resistivities and high dielectric constants compared to other intervals. Formation evaluation objectives for high frequency dielectric tool 10 are to determine flushed zone water saturation, to determine hydrocarbon moveability, to delineate thin beds and to determine bed boundaries precisely, using the sharp vertical resolution of the dielectric log.

Figure 2:
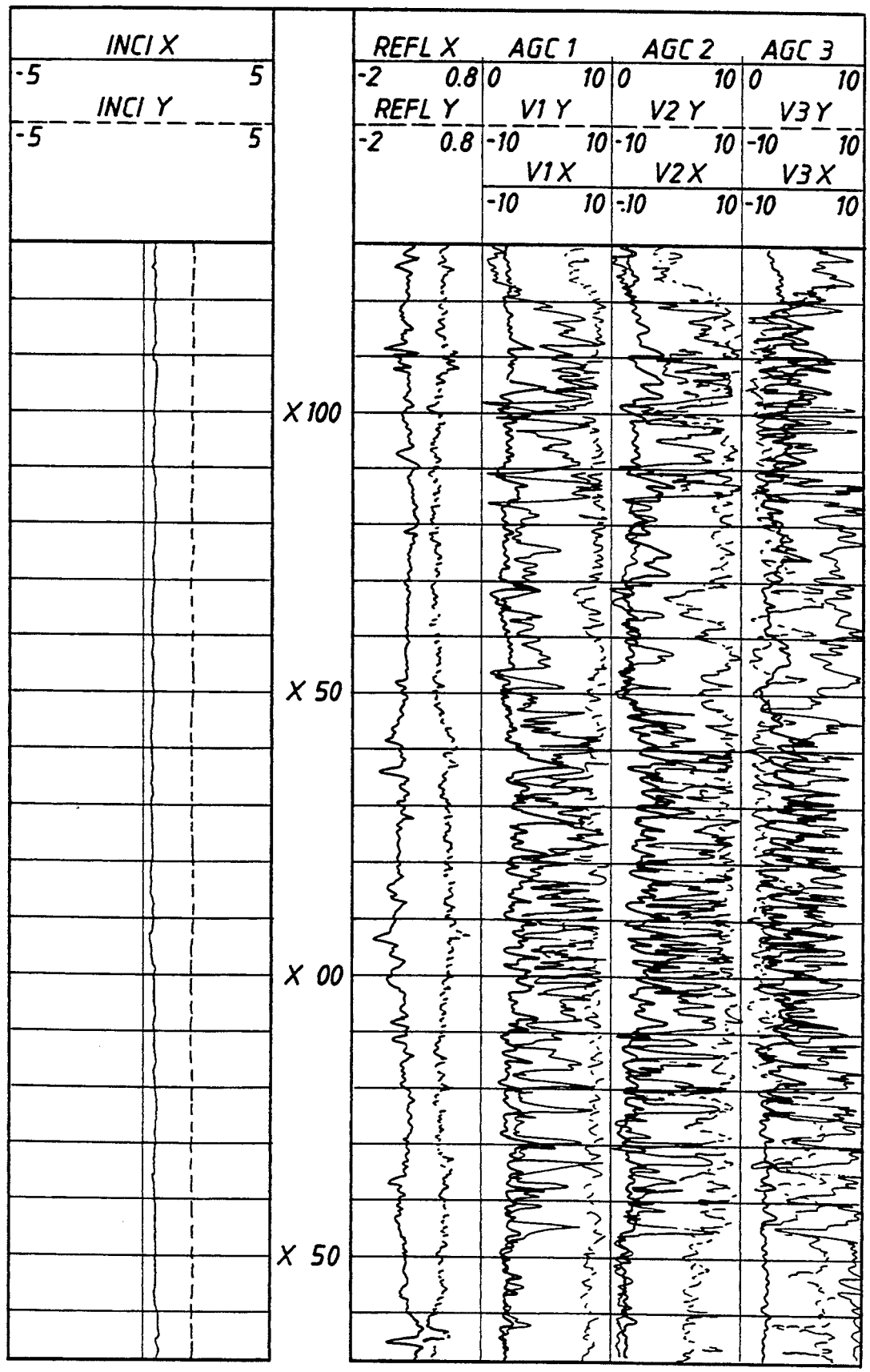
FIGS. 2, 3, 4 and 5 show various types of log data including a quality curve.

FIG. 2 shows the raw voltages adjusted only for telemetry offsets and gain factors. Transmitter incident signal voltages are shown in track 1 while tracks 2 and 3 are the transmitter reflected voltages, and voltages from each of the three receivers along with their respective AGC control voltages. The incident signal varies slightly with changes in formation impedance. By contrast, the receiver voltages exhibit the wide dynamic range permitted by the circuitry. This particular presentation of FIG. 2 is useful for diagnostic purposes and also shows the data before processing.

Figure 3:
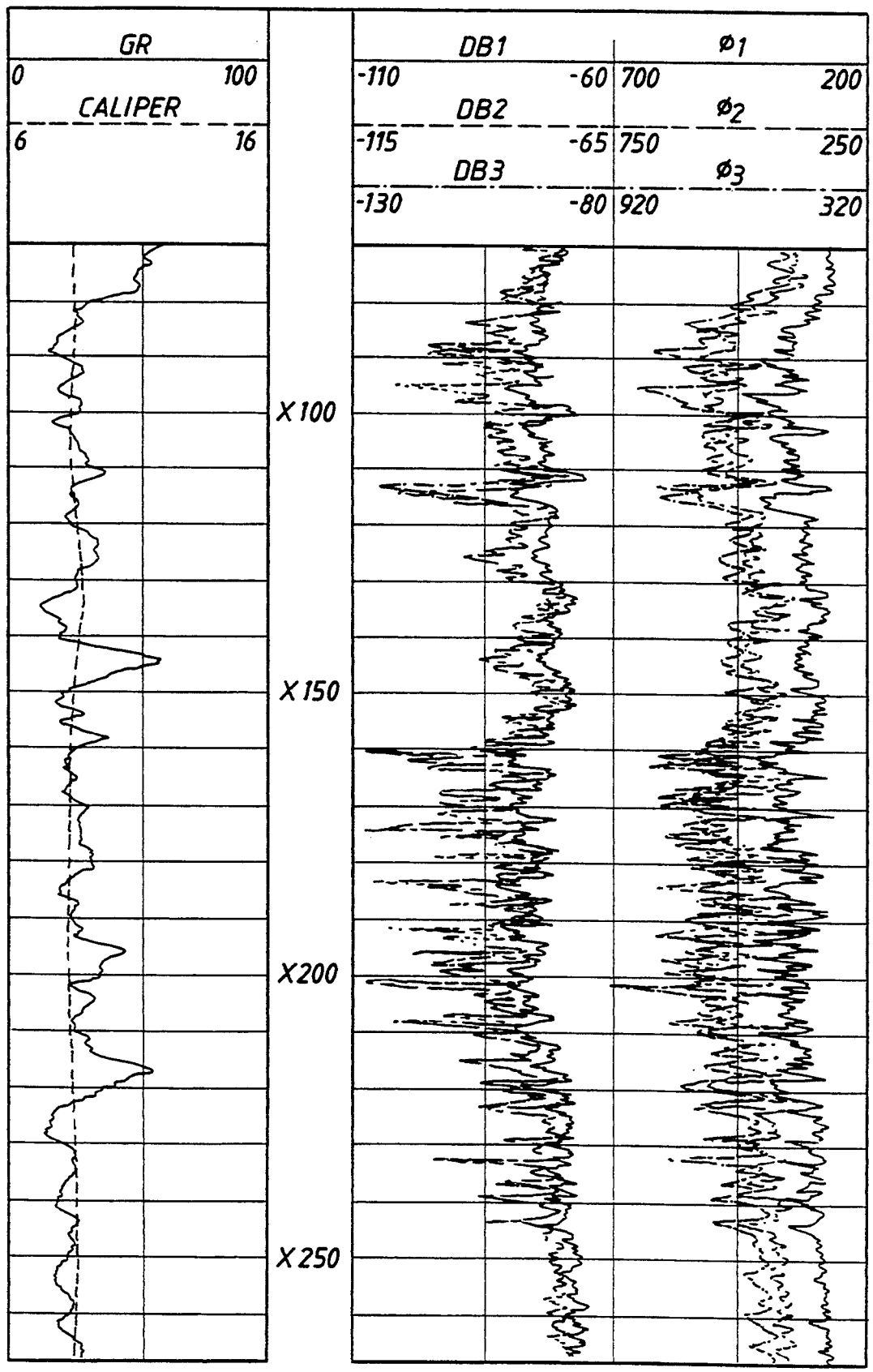
Figure 5:
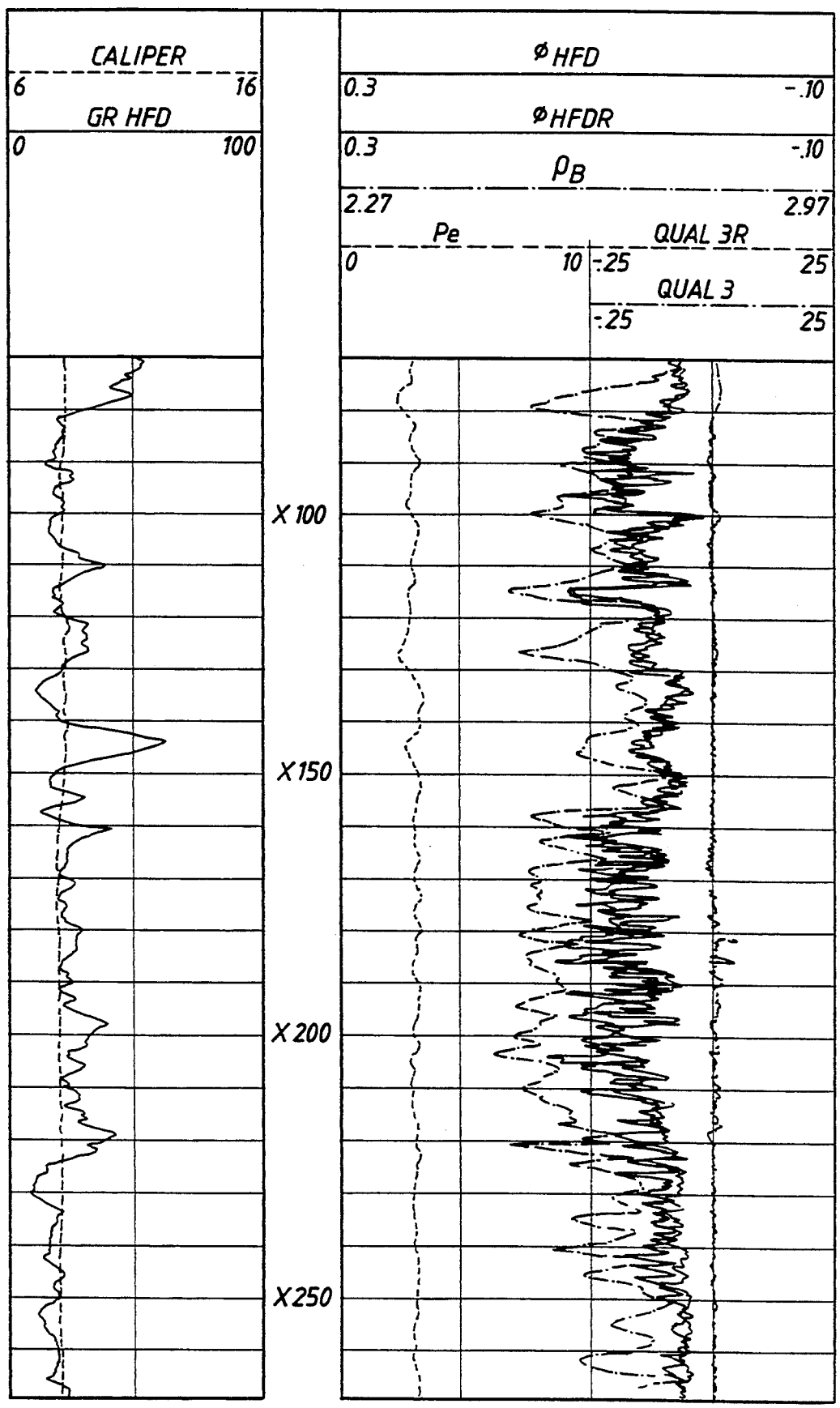

While FIG. 5 represents the signals before processing, the next stage of signal processing involves the phases and amplitudes at each of the three receivers from FIG. 3. Amplitudes are shown in track 2 and are expressed in dB; phases are in track 3 and are expressed in degrees. Because the far receiver is further and its spacing, samples larger volumes of the formation, there is a greater dynamic range for the far receiver.

Figure 4:
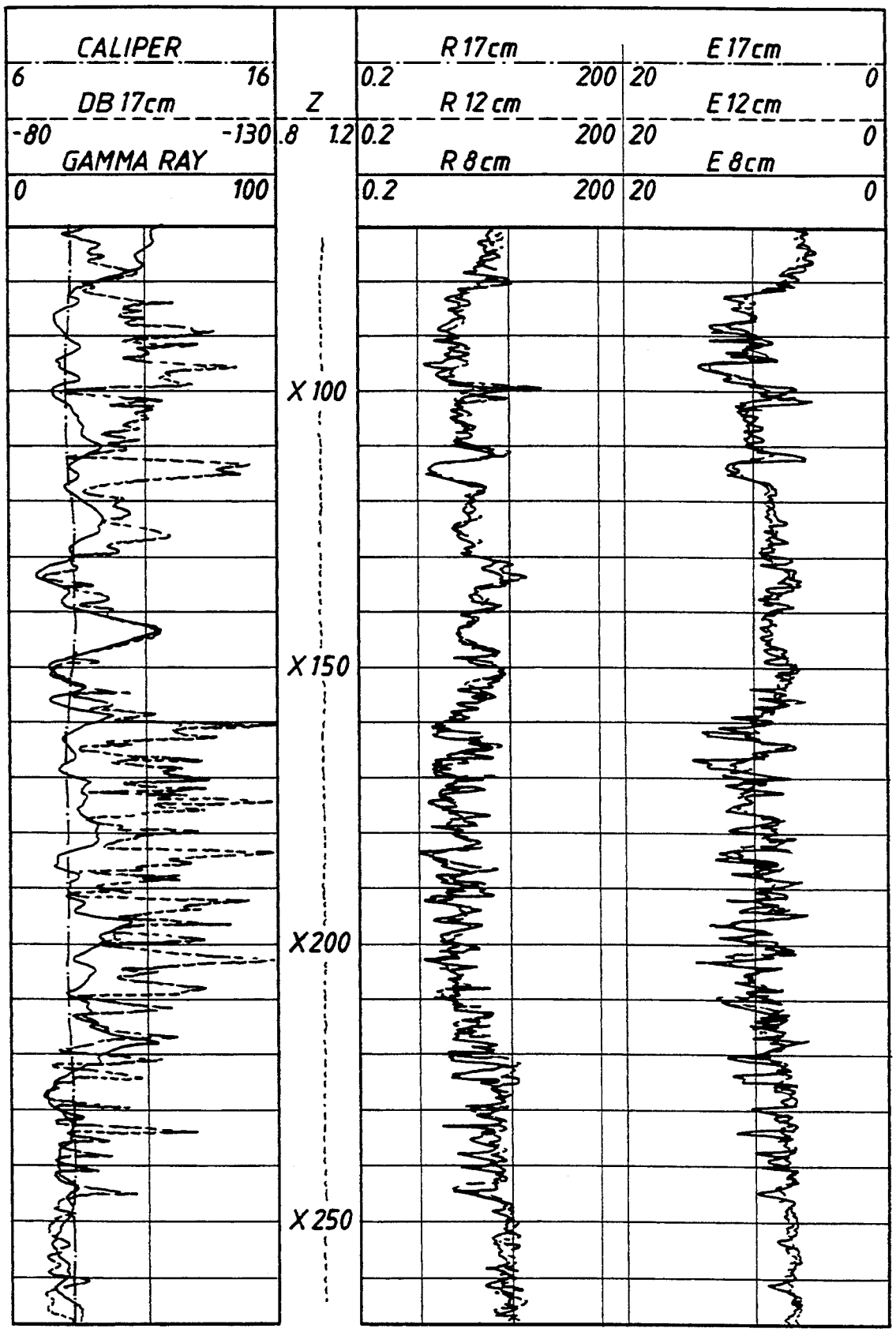

The standard log presentation is shown in FIG. 4 in track 1, gamma ray and attenuation of the far receiver are presented and data from the Z axis accelerometer 52 is presented in the depth track. The 1 GHz resistivities and dielectric constants are computed in realtime from the data shown in FIG. 4 and are presented in tracks 2 and 3 respectively. The porous and permeable intervals have high attenuation and low resistivity because of the invasion of the salt mud into the flushed zone. Flushing effects of the filtrate can also be seen in FIG. 5 where the apparent water filled porosity on the dielectric main and repeat sections are overlain with the gm/cc density log scaled for a 2.80 gm/cc matrix. The more permeable dolostones (at X082 to X140 and also 157 to 223) have a higher dielectric porosity than less permeable dolostone at X240 to X262 which has about the same porosity. In track 3, there are main pass and repeat pass high frequency dielectric quality curves which are derived from the computation of apparent water filled porosity. Except at X181 and X183 feet, where the quality curve spikes, there are no indications of rugosity effects on the high frequency log. Although in general the high frequency dielectric log repeatability over the entire logged interval is very good, the occasional lack of repeatability of the log may be caused by the pad riding different sides of this borehole (generally circular and straight) on the main and repeat passes. Significant heterogeneity was confirmed by use of a different logging tool known as circumferential acoustic scanning tool.

DATA FROM DIFFERENT TEST WELLS

Figure 6:
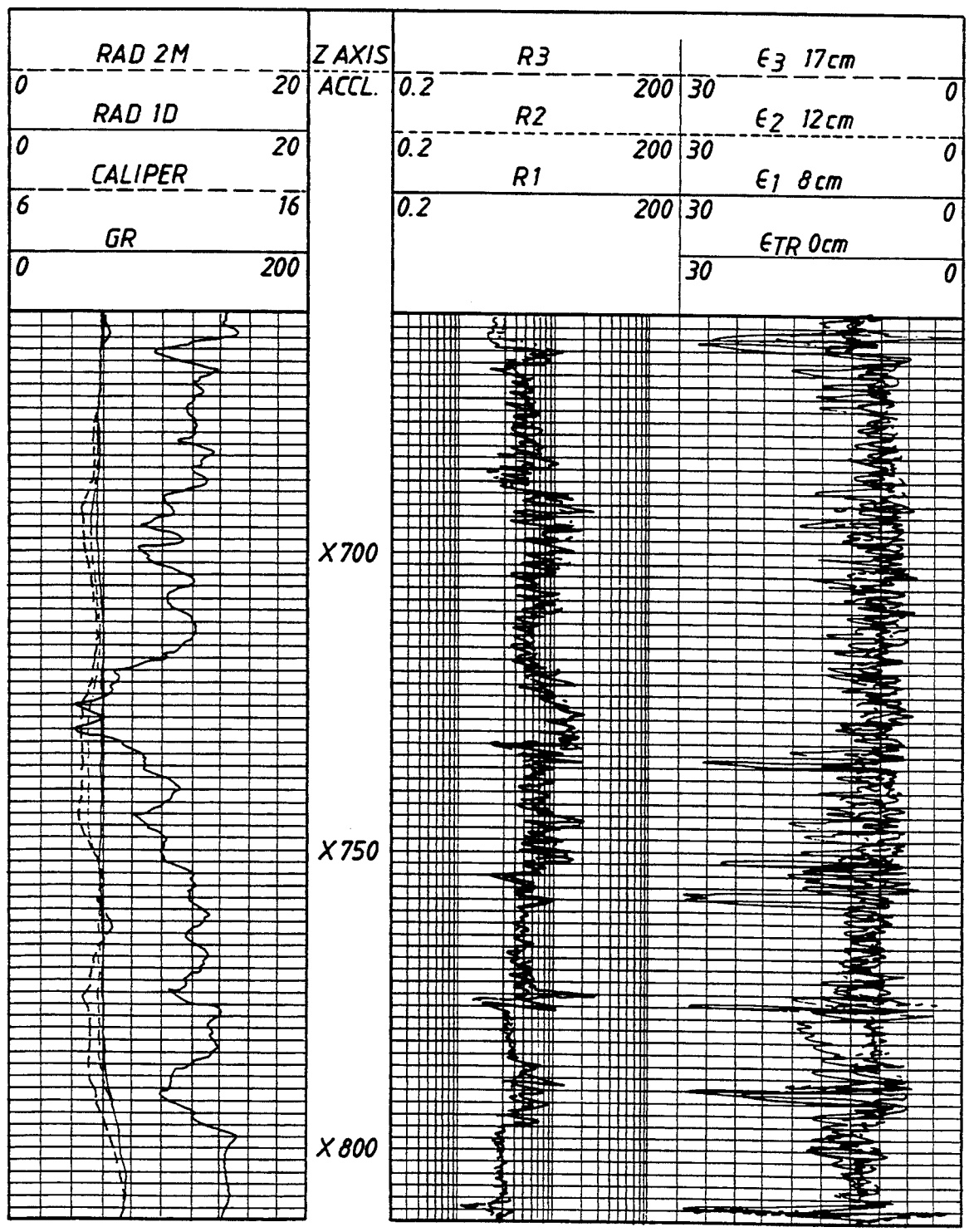
FIG. 6 is another exemplary test log including a quality curve.

FIG. 6 is a thinly bedded interval of high frequency dielectric data in Fort Worth that the assignee test facility test well #6 with the heading notations. In addition to the usual log display, the log shows uncalibrated radii RAD 2M and RAD 1D from the two independent arms, and the dielectric constant from the transmitter reflection measurement, ETR 0 cm. Correlation between the curves at different receivers is seen to be excellent. Caliper variations at X664, X668, X754, X776, X790 AND X810 feet correspond to receiver data that is of poor quality. Rugosity and standoff particularly degrade the quality of reflection measurements which have a very shallow depth of investigation and a very sharp vertical resolution. The reflection measurement may give a more accurate reading of formation properties in very thin beds from X692 to X730 feet. because of small standoff effects, however, the reflection Measurement may also be reading incorrectly high dielectric constants at X757 and X776 to X784 feet.

Figure 7:
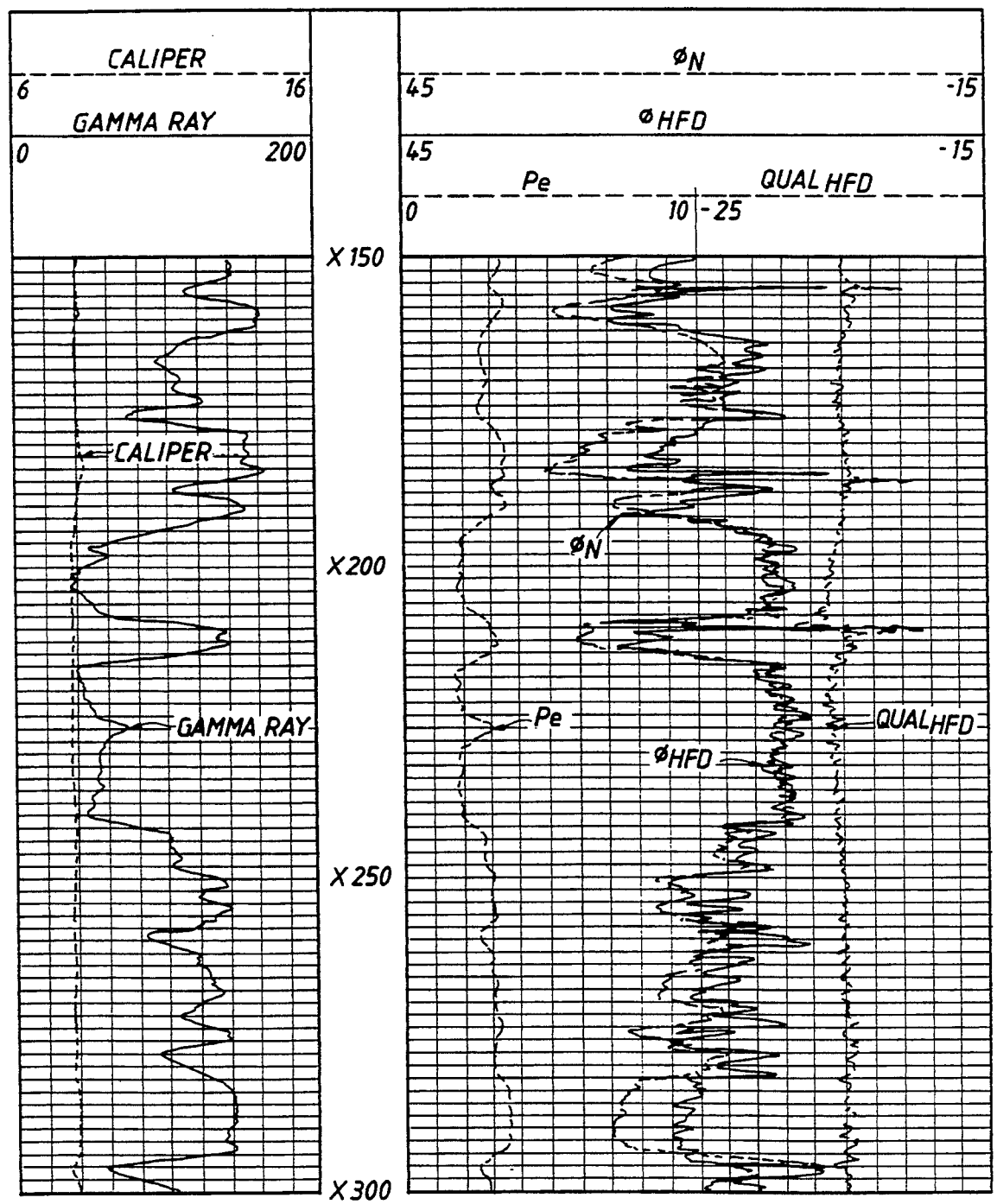
FIG. 7 is a view similar to FIG. 6 showing a quality curve.

Another section of the Fort Worth test well #6 is shown in FIG. 7, where the apparent water filled porosity from the high frequency dielectric log is plotted with dual spaced thermal neutron porosity and $P_e$ from the spectral density log. For the borehole and formation conditions for this example, neutron porosity and high frequency dielectric porosity agree very well in the sandstones. The high frequency dielectric has sharper vertical resolution, and reads a lower porosity in shales than the neutron log, probably because of absorber effects on the neutron log. The similarity between the high frequency dielectric and density or neutron log porosity depends on conditions such as shale properties, bed thickness, mud salinity and residual hydrocarbon saturation. Note that the spikes on the quality log at X155, X186 and X210 correlate perfectly with dielectric porosity and caliper anomalies in the same zones, confirming the data.

FIG. 8 illustrates a section of the high frequency dielectric log Northeastern Oklahoma test well containing fresh mud. The formations are primarily share and porous freshwater sands with a few thin, calcareous beds. Track 1 shows the caliper, far receiver attenuation and gamma ray curves. The logs display a Z axis accelerometer curve scaled from 0.8 to 1.2 G in the depth column, and the three high frequency resistivity curves are in track 2. The regions between the near and far receiver resistivities, such as X436 to X442 feet and X558 and X598 feet, are shaded. The Z axis accelerometer curve (in the depth track) is relatively constant, indicating steady ascent of the tool through the borehole with attendant good vertical resolution of the resistivity and dielectric data. Track 3 displays the dielectric constant.

In addition to furnishing accurate data useful in calculating $X_{x0}$, the high vertical resolutions of the measurements are also helpful in defining precise bed boundaries and in delineating thin zones. For example, the boundaries of the thick sandstone from X552 to X600 feet are clearly evident as is the shale break at X561 feet. The hard calcareous streaks from X489 to X502 feet are sharply defined as is the hard streak at X442 feet at the base of a sand. In this fresh mud example, the attenuation of the 17 cm receiver and gamma ray curves exhibit similar behavior, but the attenuation curve has significantly better vertical resolution.

Comparison of this high frequency dielectric log and microlog resistivities show evidence of mudcake which strongly impacts the near receiver data, but the mudcake has only a minimal effect on far receiver data. Thus, the near and far receiver curves tend to separate if mudcake is present. The resistivity and dielectric values measured by the far receiver are very nearly equal to the true flushed zone values. Evidence of mudcake from the present high frequency dielectric log and microlog resistivities is similar in this example with the present system resistivities actually showing more separation. Narrow vertical resolution is useful for bed delineation; Generally, this system, especially as seen in the 17 cm receiver attenuation curve, exhibits sharper vertical resolution than the microlog data from the same well.

While the foregoing is directed to the preferred embodiment, the scope of this disclosure is determined by the claims which follow:

I claim:

1. A method of forming a quality curve useful in evaluating high frequency dielectric well logging measurements wherein the method comprises the steps of propagating a high frequency electromagnetic signal through an earth formation adjacent a well borehole using at least one transducer and making measurements relating to the high frequency signal propagated through the formation; determining the formation's complex propagation constant, said constant having a resistivity component and a dielectric constant component; determining the formation's complex apparent water filled porosity as a function of said resistivity and dielectric constant components, said complex apparent water filled porosity having a real component and an imaginary component; and providing a quality indicator corresponding to the imaginary component of said complex water filled porosity.

2. The method of claim 1 wherein the high frequency signal is transmitted into the formation adjacent a well borehole while making absolute measurements at transmitter and receiver transducers adjacent to the formation and the absolute measurements determine formation resistivity and dielectric constant.

3. The method of claim 1 wherein the step of propagating comprises the steps of positioning a transmitter transducer against the formation adjacent to a well borehole and moving the transmitter transducer along the well borehole to make repeated measurements.

4. The method of claim 3 wherein the transmitter transducer transmits to a receiver transducer positioned against the same formation materials and wherein the complex formation propagation constant is determined for the formation materials from measurements made at the receiver transducer.

5. The method of claim 4 further including the step of measuring the location of the transducers in the well borehole and recording the quality indicator as a function of depth in the well borehole.

6. The method of claim 1 including the step of transmitting from the transmitter transducer and receiving axially displaced along the well borehole at two or more receiver transducers the transmitted signal and determining the quality indicator associated with each of the two receiver transducers.

7. The method of claim 1 wherein said at least one transducer comprises transmitter and receiver transducers.

8. The method of claim 1 wherein said at least one transducer comprises a transmitter transducer.

* * * * *

UNITED STATES PATENT AND TRADEMARK OFFICE
CERTIFICATE OF CORRECTION

PATENT NO.: 5,367,262

DATED: November 22, 1994

INVENTORS: MICHAEL J. MANNING

It is certified that errors appears in the above-identified patent and that said Letters Patent is hereby corrected as shown below:

Column 1, line 26, after "deploys" delete ";"; and
  line 54, delete "Melody" and insert therefore --Metody--.

Column 3, line 30, delete "tool" and insert therefore --the tool of--.

Column 4, line 28, after "may" insert --be--; and
  line 53, delete "anti" and insert therefore --and--.

Column 5, line 3, delete "non zero" and insert therefore --non-zero--;
  line 51, delete "rotor" and insert therefore --four--;
  line 58, delete "receive is" and insert therefore --receives--; and
  line 63, delete "wilt" and insert therefore --will--.

Column 6, line 65, delete "I" and insert therefore --1--.

Column 7, line 7, after "transmitter" insert --,--;
  line 22, delete "or" and insert therefore --of--; and
  line 64, after "cause" delete --;--.

Column 8, line 53, after "medium" insert --in--.

Column 9, line 19, after "stated" delete "." and insert therefore --,--; and
  line 45, after "$S^R_{22}$", insert --]--

Column 10, line 61, after "spacing" delete ",".

UNITED STATES PATENT AND TRADEMARK OFFICE
CERTIFICATE OF CORRECTION

PATENT NO.: 5,367,262

DATED: November 22, 1994

INVENTORS: MICHAEL J. MANNING

It is certified that errors appears in the above-identified patent and that said Letters Patent is hereby corrected as shown below:

Column 11, line 27, after "data" insert --from-- and delete "in Fort Worth that";
 line 28, after "#6" insert --in Fort Worth";
 line 42, delete "because" and insert therefore --Because--;
 line 43, delete "Measurement" and insert therefore --measurement--; and
 line 65, delete "share" and insert therefore --shale--.

Column 12, line 19, delete "a" and insert --the--; and
 line 35, delete ";" and insert therefore --.--.

Signed and Sealed this

Eleventh Day of July, 1995

BRUCE LEHMAN

*Attest:*

*Attesting Officer*

*Commissioner of Patents and Trademarks*